US010229422B2

(12) United States Patent
De et al.

(10) Patent No.: US 10,229,422 B2
(45) Date of Patent: Mar. 12, 2019

(54) MANAGEMENT OF PERSONALIZED ADVERTISEMENTS THROUGH THE MASS MEDIA (75) Inventors: Pradipta De, New Delhi (IN); Kuntal Dey, West Bengal (IN); Seema Nagar, Tahsil-Khanpur (IN)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 13/596,397

(22) Filed: Aug. 28, 2012

(65) Prior Publication Data

US 2014/0067498 A1 Mar. 6, 2014

(51) Int. Cl.
G06Q 30/00 (2012.01)
G06Q 30/02 (2012.01)
G05B 19/418 (2006.01)

(52) U.S. Cl.
CPC .................................. G06Q 30/02 (2013.01)

(58) Field of Classification Search
None
See application file for complete search history.

(56) References Cited

U.S. PATENT DOCUMENTS

| | | | |
|---|---|---|---|
| 6,336,099 B1 | 1/2002 | Barnett et al. | |
| 6,675,165 B1 | 1/2004 | Rothschild | |
| 7,636,672 B2 | 12/2009 | Angles et al. | |
| 7,665,107 B2 | 2/2010 | Goodman et al. | |
| 7,693,752 B2 | 4/2010 | Jaramillo | |
| 2006/0074769 A1* | 4/2006 | Looney | G06Q 30/02 705/14.66 |
| 2008/0201305 A1* | 8/2008 | Fitzpatrick | G06F 17/30867 |
| 2009/0292930 A1* | 11/2009 | Marano | G06F 21/6218 713/189 |
| 2011/0040627 A1 | 2/2011 | Brewer et al. | |
| 2011/0161142 A1* | 6/2011 | Dunn | G06Q 30/02 705/14.1 |
| 2011/0307918 A1* | 12/2011 | Shuster | G06F 17/30817 725/23 |

(Continued)

FOREIGN PATENT DOCUMENTS

WO 2002029665 A1 4/2002
WO 2008115683 A1 9/2008

OTHER PUBLICATIONS

"Community-based applications", Bell Labs Technical Journal ( vol. 15, Issue: 4, Mar. 2011 ).*

(Continued)

*Primary Examiner* — Maria V Vanderhorst
(74) *Attorney, Agent, or Firm* — Ryan, Mason & Lewis, LLP (57) ABSTRACT Techniques, an apparatus and an article of manufacture for management of personalized advertisements through the mass media. A method includes capturing content of an advertisement that is displayed publically and/or publically accessible to a plurality of individuals through a mass media mechanism by recording an image of the advertisement using a hand-held device, storing the content of the advertisement in a user-dedicated repository, and managing the content of the advertisement in the user-dedicated repository to facilitate distribution of the advertisement through the user to one or more additional individual users.

9 Claims, 3 Drawing Sheets (56) References Cited

U.S. PATENT DOCUMENTS

2012/0101904 A1   4/2012  Spooner et al.

OTHER PUBLICATIONS

"Enhanced advertising for next generation networks". ISBN (CD-ROM): 978-92-61-12891-3. Publication date: Aug. 1, 2009. (Year: 2009).*
Gao et al., Smart Mobile-ad: An Intelligent Mobile Advertising System, The 3rd International Conference on Grid and Pervasive Computing, 2008.
Hsiang, A Simple and Secure Mobile Coupon Scheme, Conference on Information Technology and Applications, 2009.
Shojima et al., An Incentive Attached Peer to Peer Electronic Coupon System, Studies in Informatics and Control, 2004.
Shojima et al., A Method for Mediator Identification Using Queued History of Encrypted User Information in an Incentive Attached peer to peer Electronic Coupon System, 2004.

* cited by examiner

FIG. 1

*FIG. 4*

MANAGEMENT OF PERSONALIZED ADVERTISEMENTS THROUGH THE MASS MEDIA

FIELD OF THE INVENTION

Embodiments of the invention generally relate to information technology, and, more particularly, to marketing technologies.

BACKGROUND

Advertisement in mass public media includes, for example, the use of billboards and newspapers. Such advertisements (ads) generally cannot be used as-is, and are not personalized. Additionally, further distribution of such ads typically needs to be carried out by word-of-mouth.

Accordingly, a need exists to distribute and manage mass media ads so as to enable an advertiser to track a flow of the ad as well as to personalize the ad at multiple levels.

SUMMARY

In one aspect of the present invention, techniques for management of personalized advertisements through the mass media are provided. An exemplary computer-implemented method for distributing a mass media advertisement through one or more individual users can include steps of capturing content of an advertisement that is displayed publically and/or publically accessible to a plurality of individuals through a mass media mechanism by recording an image of the advertisement using a hand-held device, storing the content of the advertisement in a user-dedicated repository, and managing the content of the advertisement in the user-dedicated repository to facilitate distribution of the advertisement through the user to one or more additional individual users.

In another aspect of the invention, an exemplary computer-implemented method for tracking a mass media advertisement through one or more individual users can include steps of capturing content of an advertisement that is displayed publically and/or publically accessible to a plurality of individuals through a mass media mechanism by recording an image of the advertisement using a hand-held device, storing the content of the advertisement in a user-dedicated repository that is searchable by one or more additional users, enabling the one or more additional users to obtain the content of the advertisement from the user-dedicated repository, and tracking a flow of the advertisement from a source user to the one or more additional users until redemption of the advertisement by maintaining a sequence of user identifiers corresponding to each user that obtains the content of the advertisement from a user-dedicated repository of another user.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes distribution and management framework of personalized advertisements through mass media. At least one embodiment of the invention includes collecting coupons and/or ads from various mass media channels based on personalization rules set by an advertiser. Additionally, aspects of the invention include storing and managing ads in an entity's dedicated repository, as well as providing search capabilities on the stored coupons and/or ads. Management capabilities further enable determination of rules to set visibility modes of the coupons. As described herein, the entity can share the ads/coupons with other entities, thereby allowing ads to be distributed without an advertiser's direct intervention.

Additionally, at least one embodiment of the invention includes tracking the flow of an ad from a source until actual usage of the ad by a user, who may have acquired the ad/coupon from a series of forwards by intermediate entities.

Figure 1:
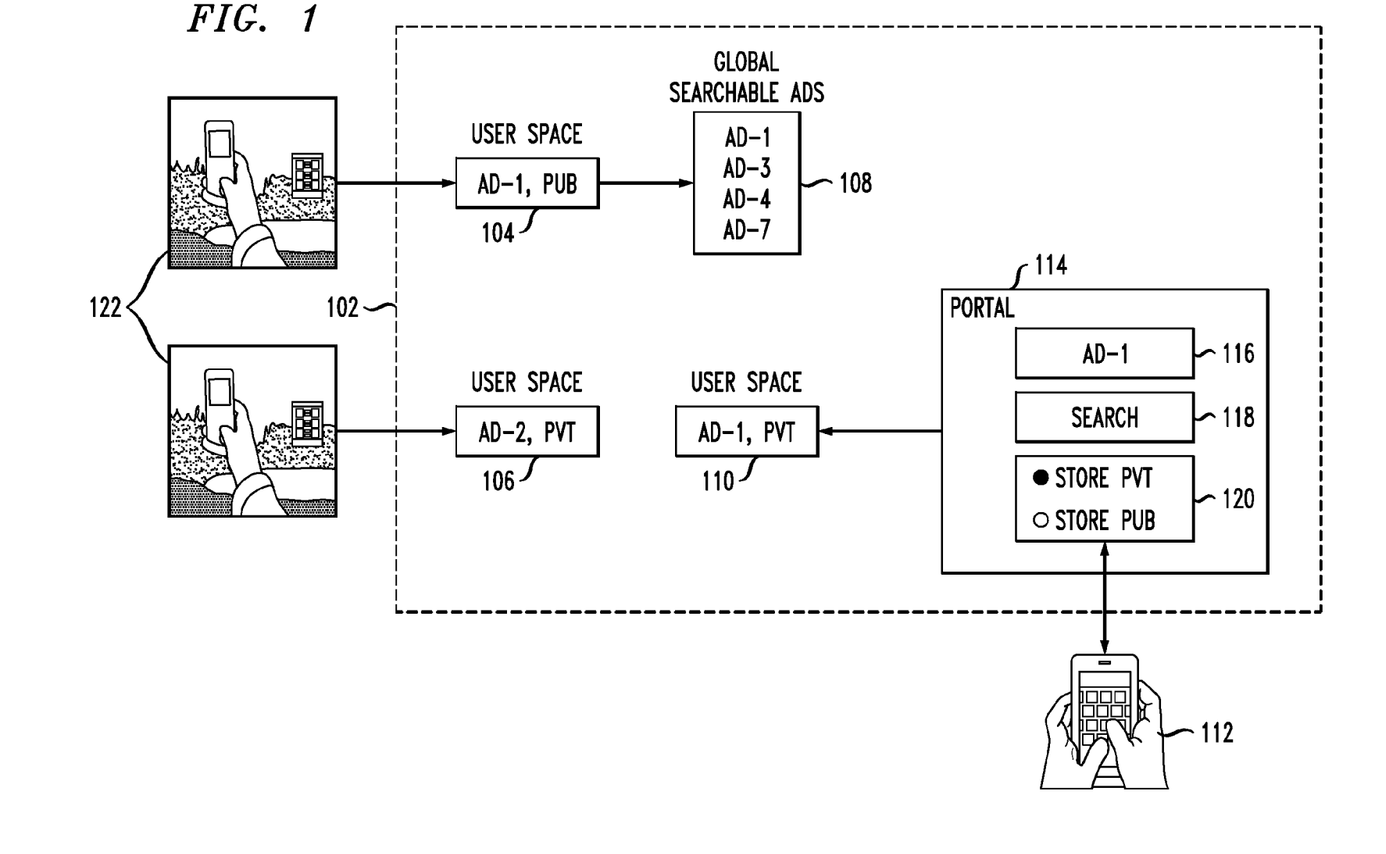
FIG. 1 is a block diagram illustrating example system architecture, according to an aspect of the invention.

FIG. 1 is a block diagram illustrating example system architecture, according to an aspect of the invention. By way of illustration, FIG. 1 depicts the system 102 with user space components 104, 106 and 110, a global searchable ad component 108 and a portal 114. The portal 114 includes an ad component 116, a search component 118 and a storage component 120 (for both public and private ad data). As also depicted in FIG. 1, the system 102 receives input and/or provides output to user devices 112 and 122.

System component 102, as depicted in FIG. 1, includes the logical depiction of the functions provided by a service provider. The component 102 resides in the backend supported by the service provider, and the functionalities are accessed as web services from any Internet enabled device. Component(s) 122 depicts a public advertisement, represented as a Quick-Response (QR) code, that a user captures using his or her device (which could be a mobile phone camera, etc.). The user uploads this image into the user authorized storage space using Internet connectivity. The QR-code contains details about the advertiser and the advertisement attributes. As illustrated in the example embodiment in FIG. 1, User-1 stores Ad-1 in his/her storage space 104 and marks the ad as a public advertisement. Similarly, User-2 stores another advertisement in his/her storage space 106 and marks the ad as private. An ad marked public is shared with others, while a private ad is not available for sharing.

Shared ads obtained by users are collected in the global searchable ad space 108. Accordingly, when User-3, for example, is looking for some advertisement and associated coupons, he/she logs-in to the service provider portal 114, and he/she searches for ads of different types, and retrieves Ad-1 because it is public. If he/she likes the ad, he/she can store it in his/her coupon store 110 (and as shown in FIG. 1, he/she marks it as private, which implies that he/she does not want to share it with others). Component 112 depicts that user access to the portal 114 can be enabled over mobile devices with Internet connectivity.

As described herein, entities involved in the operation of aspects of the invention can include, for example, an advertiser, a consumer, one or more hosting sites, and an identification (ID) verification server, which can be used to authenticate the identity of user information such as a phone number. Accordingly, in at least one embodiment of the invention, an advertiser sends an ad through different channels such as mass media, personal devices, etc., and a user can store the ad content for potential subsequent use. In at least one embodiment of the invention, the user stores the ad content in a web based storage repository. This can include a web service that allows one to upload a coupon to be stored in a cloud-based coupon repository. Additionally, the user can distribute the stored ad content to other users, as there may be, for example, incentives associated with distribution. Further, as detailed herein, an aspect of the invention includes enabling the advertiser to track the flow of an ad until it is ultimately redeemed.

By way of illustration, consider the following example embodiment. Advertiser-M places an ad on a mass public media (such as a billboard, a newspaper ad, etc.) proposing a discount offer (using, for example, a quick response (QR) coded message). The ad contains information such as identity of the merchant, the noted discount value, along with other embedded attributes. By way of example, a typical attributes can include <Ad-id, trackFlag=[ON/OFF]>.

Additionally, in this example embodiment, User-A takes a picture of the QR-coded ad on his or her mobile device (smart phone, etc.), and User-A stores the ad/coupon to a personal coupon space in a storage component hosted by a provider. The storage is provided by a service provider which hosts the advertisement sharing portal. Each user can create an account and have an authorized storage space within which he/she can store ads and/or coupons, and mark ads to be either distributed across some or all users, or prevent ads from being shared. During the storing process, a user can mark or annotate the ad/coupon to be searchable by other users. Such annotations can include marking a private (pvt) ad/coupon as non-searchable, and marking a public (pub) ad/coupon as searchable.

The ad/coupon can be further marked or annotated with additional attributes, as checked by the service provider. For example, ID checking/confirming is carried out by an ID service by using the phone number of the user. If the user is uploading using his/her mobile phone or any social network account ID, then the ID service maps the diverse ID to a unique user. The ID service connects the different log-ins to uniquely identify the user for tracking purpose. Further, by way of example, such additional attributes can include <MERCHANT-001, OFF>.

This example embodiment can also include User-B searching for any coupon from Advertiser-M while User-B is logged-in to the advertisement portal as exposed by the service provider hosting the coupon/ad store service. Assume, by way of illustration, that User-B finds the MERCHANT-001 ad noted above. User-B can store this coupon for potential subsequent use (if not already in a local storage component of User-B's mobile device) in a storage component hosted by a provider, and User-B can also go to a store of Advertiser-M with store-ID M-1, and redeem the stored ad/coupon (B is the redeemer). Accordingly, User-B can send a message to the host of the storage component to redeem coupon from his/her coupon store (that is, storage component). Alternatively, User-B can present his/her (downloaded) copy of the ad/coupon (for example, the QR code) to a representative of store M-1 for redemption.

If a message is sent to the host of the storage component, the host checks the user account (tracked by ID(user) such as the user's phone number) for the relevant ad/coupon, and sends a message to store M-1 for redemption, the message including the coupon ID and user ID (User-B). The message can be sent over short message service (SMS) or any other appropriate Internet channel. Because the original ad contains the merchant ID, the advertisement portal knows where to deliver the message. If the ad/coupon is presented by User-B to the merchant at store M-1 directly for redemption, the merchant copies the coupon and further obtains the user ID (User-B) from B. The merchant can use an openly available QR-code scanner software to read the coupon, and the user can be identified, for example, using his/her mobile number/ID to validate if he/she owns the coupon by contacting the service provider's backend which must have the coupon stored in the specified user's storage. The merchant (MERCHANT, as noted in this example) then updates the current usage count of coupon type MERCHANT-001. The merchant sends this message back to the service provider. Once a coupon is redeemed, it is invalidated from the user's store.

In this example embodiment, if tracking capabilities are also enabled, the host of the storage component maintains the sequence of user-IDs on each store operation (for example, M→A→B→C). Upon completion of a redemption operation, the node that has redeemed the ad/coupon is marked out of the sequence as redeemed. Alternatively, tracking can be performed via use of attributes per coupon, such as, for example, <Ad-id, Uploader, trackFlag, Downloader>. Accordingly, the "uploader" and "downloader" fields are updated when a user "stores" an ad/coupon.

By way of additional illustration, consider the following example embodiment. Advertiser-M places an ad on a mass public media (such as a billboard, newspaper ad, etc.) making a discount offer (for example, via a QR code). The ad contains information such as identity of the merchant, the discount value, etc., as well as additional attributes such as <Ad-id, Uploader=ID(Ad-M), trackFlag=ON, Downloader=NULL>. User-A takes a picture of the QR-coded ad (for example, via his or her smart phone or mobile device) and uploads picture of the ad to a personal coupon space through a portal (such as component 114 in FIG. 1), and marks the ad to be available for other users to search.

The coupon is marked or annotated with additional attributes such as <MERCHANT-001, ID(User-A), ON, ID(Ad-M)>. Accordingly, User-B can search for any coupon by M while User-B is logged-in; in this example, User-B finds the MERCHANT-001 ad/coupon. User-B downloads the coupon including attributes <MERCHANT-001, ID(User-A), ON, ID(User-B)>, and User-B uploads the same coupon for potential subsequent use. As such, the coupon's uploader and downloader fields are swapped to indicate the change of role, and this helps in tracking the flow of the coupon. Specifically, the relevant attributes now include <MERCHANT-001, ID(User-B), ON, ID(User-A))>.

User-B can go to an M store with store-ID M-1 to potentially redeem the stored coupon (B would be the redeemer in this scenario). Accordingly, User-B can send a message to the host of User-B's personal coupon storage space to redeem the coupon from his/her coupon store/storage, or User-B can presents his/her (downloaded) copy of the coupon (for example, the QR code) to a representative of store M-1. If a message is sent to the host of User-B's personal coupon storage space, the host checks/confirms the user account (tracked by ID(user) such as the user's phone number) for the coupon, and sends a message to store M-1 for redemption of the coupon, the message including the coupon ID and user ID(User-B).

Alternatively, if the coupon is presented to the merchant directly for redemption, the merchant copies the coupon and further obtains ID(User-B) from B. The merchant (MERCHANT) also updates the current usage count of coupon type MERCHANT-001, as well as the referrer's account (account of ID(User-A)) to reflect an influence event. Updating the referrer's account can include the following options and/or updates:

- If ((ID(Downloader)=NULL) and (ID(Uploader=ID(Ad-M))) credit(none);
- If ((ID(Downloader)=NULL) and (ID(Uploader)=ID(Redeemer))) credit(none);
- If ((ID(Downloader)=ID(Uploader)) mark coupon invalid and raise flag; else, credit(ID(Uploader)).

(In the above example embodiment, ID(Downloader)=User-B and ID(Uploader)=User-A.)

An embodiment of the invention can additionally include a short message service (SMS)-based operation (for example, on non-Java based phones). By way of illustration, an example embodiment including this aspect can include the following. A store displays a QR-coded ad, and a user takes picture of the ad (via his or her smart phone or mobile device) and sends the picture to a storage component SMS-gateway number. The storage component (that is, the user-authenticated storage assigned to the user during account creation similar to components 104 and/or 106 in FIG. 1) stores the coupon (the QR code) in the user's (identified, for example, by phone number) local coupon store/storage. The storage component can also contact the user to query for selection of a distribution mode (private or public), for example, using unstructured supplementary services data (USSD).

For ad searching capabilities, the user can call a fixed number to search for coupons related to a store. Once the user calls the number, he/she can identify the store name, and any coupon with the same store name is pulled out during the search. If the user is satisfied with one of the search results, he/she can ask for one or more coupons/ads to be added to his/her coupon store. Subsequently, during redemption of this coupon, the user sends a message to the host of the storage component requesting retrieval of the particular coupon for redemption (based either on coupon ID or on search attributes), and the host of the storage component sends a message via SMS in the form of a receipt to both the user and the merchant. The receipt indicates that the coupon has been used-up/redeemed, and notifies the merchant that it is offering the specified discount to the customer with a particular customer ID. The merchant can additionally, for example, ask the customer to show that he/she is the customer with the noted customer ID.

Additionally, in at least one embodiment of the invention, personalization can be advanced based on usage of various attributes such as user-preference, user location, user activity, etc. Also, incentives can be provided to users whose public ads are being redeemed at a pre-defined frequency or amount, as based on the trackability feature of at least one embodiment of the invention. Further, an aspect of the invention can include facilitating a merchant to set policy on coupon usage. Such policy can include defining a maximum usage of a specific coupon, enabling distribution history (a trackFlag attribute), etc.

In tracking an ad flow across multiple intermediate individual or corporate distributors, a merchant or advertiser can use the tracking information analytics or, as noted above, for incentivizing one or more users in an ad flow path.

Additionally, in at least one embodiment of the invention, personalization of an ad can be carried out at multiple levels. By way of example, meta-information and rules for personalization can be embedded in the displayed ad. Also, during store operation, other user-specific information can be used to instantiate a personalized copy of the ad (or instantiate actions such as, for example, increasing the discount value for a loyal customer/user).

Figure 2:
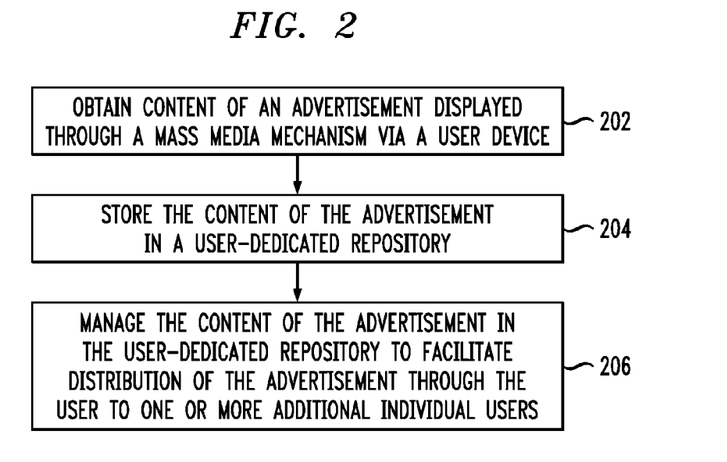
FIG. 2 is a flow diagram illustrating techniques for distributing a mass media advertisement through one or more individual users, according to an embodiment of the invention.

FIG. 2 is a flow diagram illustrating techniques for distributing a mass media advertisement through one or more individual users, according to an embodiment of the invention. Step 202 includes capturing content of an advertisement that is displayed publically and/or publically accessible to a plurality of individuals through a mass media mechanism (for example, a billboard or newspaper) by recording an image of the advertisement using a hand-held device (a smart phone, etc.). Content can include a quick response (QR) coded message as well as information such as merchant identity, discount value, etc.

Capturing the content can also include receiving an image of the advertisement via a user device. At least one embodiment of the invention can also include transferring the image of the advertisement to the user-dedicated repository via short message service or via the Internet.

Step 204 includes storing the content of the advertisement in a user-dedicated repository. Step 206 includes managing the content of the advertisement in the user-dedicated repository to facilitate distribution of the advertisement through the user to one or more additional individual users. Managing includes marking the advertisement as searchable by one or more additional users, as well as annotating the content of the advertisement with one or more attributes (a repository user identifier, a merchant identifier, etc.).

The techniques depicted in FIG. 2 can also include personalizing the content of the advertisement for a merchant by propagating meta-data and/or one or more advertisement usage rules based on merchant information. Additionally, at least one embodiment of the invention includes personalizing the content of the advertisement for the user in the user-dedicated repository based user data (user-preference, user location, user activity, etc.). Further, the techniques depicted in FIG. 2 can include tracking a flow of the advertisement from a user to the one or more additional users.

As also described herein, at least one embodiment of the invention includes facilitating redemption of the advertisement by a user by routing a message from the user to the user-dedicated repository requesting retrieval of the advertisement from the repository. This can include, for example, confirming a user identifier of the requesting user and sending a message to the merchant for redemption, the message including an advertisement identifying the user identifier.

The techniques depicted in FIG. 2 can additionally include updating a usage count of the advertisement after a redemption operation, as well as updating information pertaining to a referring user after a redemption operation. At least one embodiment of the invention includes providing an incentive to a referring user whose stored advertisements are being redeemed.

Figure 3:
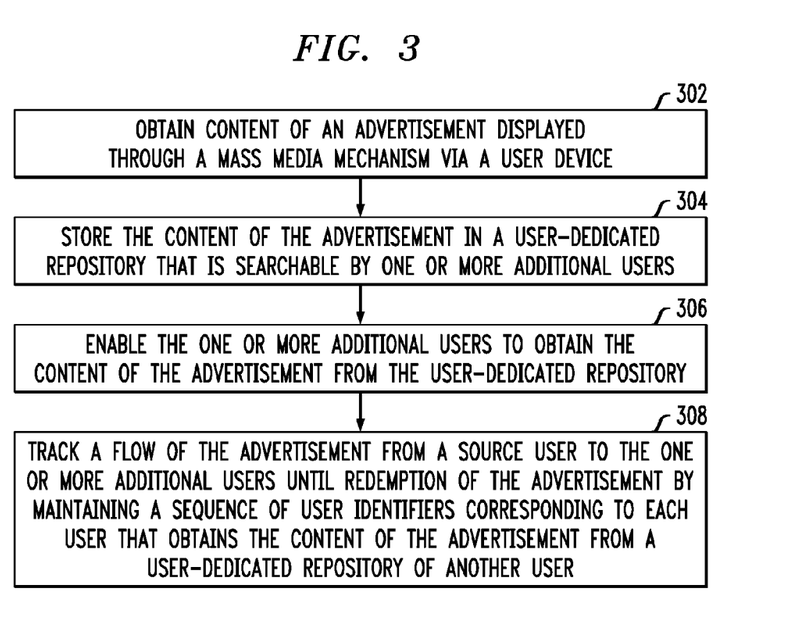
FIG. 3 is a flow diagram illustrating techniques for tracking a mass media advertisement through one or more individual users, according to an embodiment of the invention.

FIG. 3 is a flow diagram illustrating techniques for tracking a mass media advertisement through one or more individual users, according to an embodiment of the present invention. Step 302 includes capturing content of an advertisement that is displayed publically and/or publically accessible to a plurality of individuals through a mass media mechanism by recording an image of the advertisement using a hand-held device. Step 304 includes storing the content of the advertisement in a user-dedicated repository that is searchable by one or more additional users. Step 306 includes enabling the one or more additional users to obtain the content of the advertisement from the user-dedicated repository. Step 308 includes tracking a flow of the advertisement from a source user to the one or more additional users until redemption of the advertisement by maintaining a sequence of user identifiers corresponding to each user that obtains the content of the advertisement from a user-dedicated repository of another user.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
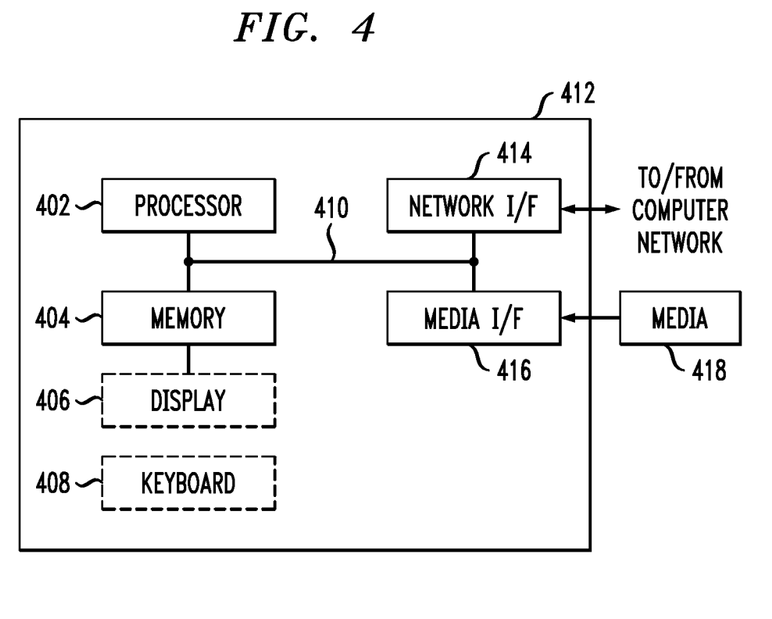
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, embedding meta-information and rules for personalization in a displayed advertisement.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for distributing a mass media advertisement through one or more individual users, the method comprising:

capturing content of an advertisement that is displayed publically and/or publically accessible to a plurality of individuals through a mass media mechanism, wherein said capturing comprises recording an image of the advertisement, via a social network account of a user, using a camera of hand-held device of the user;

personalizing the content of the advertisement to instantiate a personalized version of the advertisement for the user, wherein the personalized version of the advertisement is (a) distinct from the advertisement that is displayed publically and/or publically accessible to a plurality of individuals through a mass media mechanism and (b) distinct from a personalized version of the advertisement instantiated for a second user, wherein said personalizing is based on (i) one or more user preferences, (ii) location of the user, and (iii) past activity of the user, and wherein said personalizing comprises:

mapping a log-in of the user for the social network account of the user to a unique user identifier of the user associated with the personalized advertisement;

updating the content of the personalized advertisement by propagating meta-data and defining advertisement usage rules based on merchant information, wherein defining the advertisement usage rules comprises defining a maximum number of uses of the personalized advertisement and defining a maximum number of users of the personalized advertisement;

storing the personalized version of the advertisement in a user-dedicated repository associated with the user, wherein the user-dedicated repository is located on a backend hosted by a service provider, and wherein said storing comprises transmitting the personalized version of the advertisement from the hand-held device of the user to the user-dedicated repository via a short message system gateway number;

managing the personalized version of the advertisement in the user-dedicated repository, wherein said managing comprises:

annotating the personalized version of the advertisement via a first annotation, wherein the first annotation comprises an identification of one or more additional users expressly permitted to share the personalized version of the advertisement;

annotating the personalized version of the advertisement via a second annotation, wherein the second annotation comprises an identification of one or more additional users expressly precluded from sharing the personalized version of the advertisement;

annotating the personalized version of the advertisement with multiple attributes, wherein said multiple attributes comprise (i) a merchant identifier associated with the personalized version of the advertisement, (ii) an advertisement identifier associated with the personalized version of the advertisement, (iii) a user identifier associated with an uploader of the personalized version of the advertisement, (iv) a user identifier associated with a downloader of the personalized version of the advertisement, and (v) an indication of a tracking status associated with the personalized version of the advertisement;

facilitating distribution of the advertisement through the user to one or more additional individual users based on the first annotation and the second annotation, wherein said facilitating comprises connecting multiple distinct log-ins of the one or more additional individual users for social network accounts of the one or more additional users to the same unique user identifier of the user associated with the personalized advertisement;

routing a first message from the user to the user-dedicated repository, wherein the first message requests redemption of the personalized advertisement;

confirming the user identifier of the user associated with the message;

comparing current usage information of the personalized advertisement, associated with the message, to the defined maximum number of uses of the personalized advertisement and the defined maximum number of users of the personalized advertisement;

confirming compliance of the current usage information to the advertisement usage rules;

sending a second message to the merchant for redemption of the personalized advertisement, wherein the second message includes (i) the personalized version of the advertisement from the user-dedicated repository and (ii) the confirmed user identifier; and updating, after the redemption of the personalized advertisement, (i) a usage count of the personalized advertisement and (ii) information pertaining to the confirmed user identifier;

wherein the steps are carried out by at least one computer device.

2. The method of claim 1, comprising tracking a flow of the advertisement from the user to the one or more additional users.

3. The method of claim 1, wherein said content comprises a quick response (QR) coded message.

4. The method of claim 1, wherein said content comprises merchant identity and discount value.

5. The method of claim 1, wherein said capturing comprises receiving an image of the advertisement via a user device.

6. The method of claim 5, comprising transferring the image of the advertisement to the user-dedicated repository via short message service or via the Internet.

7. An article of manufacture comprising a non-transitory computer readable storage medium having computer readable instructions tangibly embodied thereon which, when implemented, cause a computer to carry out a plurality of method steps comprising:

capturing content of an advertisement that is displayed publically and/or publically accessible to a plurality of individuals through a mass media mechanism, wherein said capturing comprises recording an image of the advertisement, via a social network account of a user, using a camera of hand-held device of the user;

personalizing the content of the advertisement to instantiate a personalized version of the advertisement for the user, wherein the personalized version of the advertisement is (a) distinct from the advertisement that is displayed publically and/or publically accessible to a plurality of individuals through a mass media mechanism and (b) distinct from a personalized version of the advertisement instantiated for a second user, wherein said personalizing is based on (i) one or more user preferences, (ii) location of the user, and (iii) past activity of the user, and wherein said personalizing comprises:

mapping a log-in of the user for the social network account of the user to a unique user identifier of the user associated with the personalized advertisement;

updating the content of the personalized advertisement by propagating meta-data and defining advertisement usage rules based on merchant information, wherein defining the advertisement usage rules comprises defining a maximum number of uses of the personalized advertisement and defining a maximum number of users of the personalized advertisement;

storing the personalized version of the advertisement in a user-dedicated repository associated with the user, wherein the user-dedicated repository is located on a backend hosted by a service provider, and wherein said storing comprises transmitting the personalized version of the advertisement from the hand-held device of the user to the user-dedicated repository via a short message system gateway number;

managing the personalized version of the advertisement in the user-dedicated repository, wherein said managing comprises:

annotating the personalized version of the advertisement via a first annotation, wherein the first annotation comprises an identification of one or more additional users expressly permitted to share the personalized version of the advertisement;

annotating the personalized version of the advertisement via a second annotation, wherein the second annotation comprises an identification of one or more additional users expressly precluded from sharing the personalized version of the advertisement;

annotating the personalized version of the advertisement with multiple attributes, wherein said multiple attributes comprise (i) a merchant identifier associated with the personalized version of the advertisement, (ii) an advertisement identifier associated with the personalized version of the advertisement, (iii) a user identifier associated with an uploader of the personalized version of the advertisement, (iv) a user identifier associated with a downloader of the personalized version of the advertisement, and (v) an indication of a tracking status associated with the personalized version of the advertisement;

facilitating distribution of the advertisement through the user to one or more additional individual users based on the first annotation and the second annotation, wherein said facilitating comprises connecting multiple distinct log-ins of the one or more additional individual users for social network accounts of the one or more additional users to the same unique user identifier of the user associated with the personalized advertisement;

routing a first message from the user to the user-dedicated repository, wherein the first message requests redemption of the personalized advertisement;

confirming the user identifier of the user associated with the message;

comparing current usage information of the personalized advertisement, associated with the message, to the defined maximum number of uses of the personalized advertisement and the defined maximum number of users of the personalized advertisement;

confirming compliance of the current usage information to the advertisement usage rules;

sending a second message to the merchant for redemption of the personalized advertisement, wherein the second message includes (i) the personalized version of the advertisement from the user-dedicated repository and (ii) the confirmed user identifier; and updating, after the redemption of the personalized advertisement, (i) a usage count of the personalized advertisement and (ii) information pertaining to the confirmed user identifier.

8. A system for distributing a mass media advertisement through one or more individual users, comprising:

a memory; and at least one processor coupled to the memory and operative for:

capturing content of an advertisement that is displayed publically and/or publically accessible to a plurality of individuals through a mass media mechanism, wherein said capturing comprises recording an image of the advertisement, via a social network account of a user, using a camera of hand-held device of the user;

personalizing the content of the advertisement to instantiate a personalized version of the advertisement for the user, wherein the personalized version of the advertisement is (a) distinct from the advertisement that is displayed publically and/or publically accessible to a plurality of individuals through a mass media mechanism and (b) distinct from a personalized version of the advertisement instantiated for a second user, wherein said personalizing is based on (i) one or more user preferences, (ii) location of the user, and (iii) past activity of the user, and wherein said personalizing comprises:

mapping a log-in of the user for the social network account of the user to a unique user identifier of the user associated with the personalized advertisement;

updating the content of the personalized advertisement by propagating meta-data and defining advertisement usage rules based on merchant information, wherein defining the advertisement usage rules comprises defining a maximum number of uses of the personalized advertisement and defining a maximum number of users of the personalized advertisement;

storing the personalized version of the advertisement in a user-dedicated repository associated with the user, wherein the user-dedicated repository is located on a backend hosted by a service provider, and wherein said storing comprises transmitting the personalized version of the advertisement from the hand-held device of the user to the user-dedicated repository via a short message system gateway number;

managing the personalized version of the advertisement in the user-dedicated repository, wherein said managing comprises:

annotating the personalized version of the advertisement via a first annotation, wherein the first annotation comprises an identification of one or more additional users expressly permitted to share the personalized version of the advertisement;

annotating the personalized version of the advertisement via a second annotation, wherein the second annotation comprises an identification of one or more additional users expressly precluded from sharing the personalized version of the advertisement;

annotating the personalized version of the advertisement with multiple attributes, wherein said multiple attributes comprise (i) a merchant identifier associated with the personalized version of the advertisement, (ii) an advertisement identifier associated with the personalized version of the advertisement, (iii) a user identifier associated with an uploader of the personalized version of the advertisement, (iv) a user identifier associated with a downloader of the personalized version of the advertisement, and (v) an indication of a tracking status associated with the personalized version of the advertisement;

facilitating distribution of the advertisement through the user to one or more additional individual users based on the first annotation and the second annotation, wherein said facilitating comprises connecting multiple distinct log-ins of the one or more additional individual users for social network accounts of the one or more additional users to the same unique user identifier of the user associated with the personalized advertisement;

routing a first message from the user to the user-dedicated repository, wherein the first message requests redemption of the personalized advertisement;

confirming the user identifier of the user associated with the message;

comparing current usage information of the personalized advertisement, associated with the message, to the defined maximum number of uses of the personalized advertisement and the defined maximum number of users of the personalized advertisement;

confirming compliance of the current usage information to the advertisement usage rules;

sending a second message to the merchant for redemption of the personalized advertisement, wherein the second message includes (i) the personalized version of the advertisement from the user-dedicated repository and (ii) the confirmed user identifier; and updating, after the redemption of the personalized advertisement, (i) a usage count of the personalized advertisement and (ii) information pertaining to the confirmed user identifier.

9. A method for tracking a mass media advertisement through one or more individual users, the method comprising:

capturing content of an advertisement that is displayed publically and/or publically accessible to a plurality of individuals through a mass media mechanism, wherein said capturing comprises recording an image of the advertisement, via a social network account of a user, using a camera of hand-held device of the user;

personalizing the content of the advertisement to instantiate a personalized version of the advertisement for the user, wherein the personalized version of the advertisement is (a) distinct from the advertisement that is displayed publically and/or publically accessible to a plurality of individuals through a mass media mechanism and (b) distinct from a personalized version of the advertisement instantiated for a second user, wherein said personalizing is based on (i) one or more user preferences, (ii) location of the user, and (iii) past activity of the user, and wherein said personalizing comprises:

mapping a log-in of the user for the social network account of the user to a unique user identifier of the user associated with the personalized advertisement; and annotating the personalized advertisement with multiple attributes, wherein said multiple attributes comprise (i) a merchant identifier associated with the personalized advertisement, (ii) an advertisement identifier associated with the personalized advertisement, (iii) a user identifier associated with an uploader of the personalized advertisement, (iv) a user identifier associated with a downloader of the personalized advertisement, and (v) an indication of a tracking status associated with the personalized advertisement;

updating the content of the personalized advertisement by propagating meta-data and defining advertisement usage rules based on merchant information, wherein defining the advertisement usage rules comprises defining a maximum number of uses of the personalized advertisement and defining a maximum number of users of the personalized advertisement;

storing the personalized version of the advertisement in a user-dedicated repository associated with the user that is searchable by one or more additional users, wherein the user-dedicated repository is located on a backend hosted by a service provider, and wherein said storing comprises transmitting the personalized version of the advertisement from the hand-held device of the user to the user-dedicated repository via a short message system gateway number;

enabling the one or more additional users to obtain the personalized version of the advertisement from the user-dedicated repository, wherein said enabling comprises connecting multiple distinct log-ins of the one or more additional users for social network accounts of the one or more additional users to the same unique user identifier of the user associated with the personalized advertisement;

tracking a flow of the advertisement from the user to the one or more additional users until redemption of the advertisement by monitoring unique user identifier corresponding to each user that obtains the personalized version of the advertisement from a user-dedicated repository of another user, wherein said tracking comprises:

comparing the unique user identifier corresponding to each user that obtains the personalized version of the advertisement to the unique user identifiers for the one or more additional users associated with the personalized advertisement;

comparing current usage information of the personalized advertisement to the defined maximum number of uses of the personalized advertisement and the defined maximum number of users of the personalized advertisement;

confirming (i) the unique user identifier corresponding to each user that obtains the personalized version of the advertisement and (ii) compliance of the current usage information to the advertisement usage rules; and providing, based on said tracking, an incentive to the user whose stored personalized version of the advertisement is redeemed from the user dedicated repository at a pre-defined frequency and a pre-defined amount;

wherein the steps are carried out by at least one computer device.

* * * * *